United States Patent [19]

Moran et al.

[11] Patent Number: 5,492,685

[45] Date of Patent: * Feb. 20, 1996

[54] HIGH SURFACE AREA HYDRATED LIME AND METHOD OF REMOVING SO₂ FROM A GAS STREAM

[75] Inventors: David L. Moran; Massoud Rostam-Abadi, both of Champaign, Ill.

[73] Assignee: The Board of Trustees of the University of Illinois, Urbana, Ill.

[*] Notice: The portion of the term of this patent subsequent to Jun. 29, 2010, has been disclaimed.

[21] Appl. No.: 48,283

[22] Filed: Apr. 14, 1993

Related U.S. Application Data

[60] Division of Ser. No. 854,306, Mar. 20, 1992, Pat. No. 5,223,239, which is a continuation-in-part of Ser. No. 557,590, Jul. 24, 1990, abandoned.

[51] Int. Cl.⁶ .......................... C01B 17/56; C01B 17/60; C01F 11/02
[52] U.S. Cl. .................. 423/244.07; 423/635; 423/640
[58] Field of Search ............... 423/244.07, 640, 423/635

[56] References Cited

U.S. PATENT DOCUMENTS

| | | | |
|---|---|---|---|
| 948,045 | 2/1910 | Floyd | 423/637 |
| 1,960,756 | 5/1934 | Sewell et al. | 23/188 |
| 2,053,209 | 9/1936 | Snow | 196/55 |
| 2,230,761 | 2/1941 | Pozzi | 23/189 |
| 2,497,636 | 2/1950 | Stowell | 167/45 |
| 2,784,062 | 3/1957 | Locke et al. | 23/188 |
| 2,888,324 | 5/1959 | Allen | 23/188 |
| 3,120,444 | 2/1964 | Dunton et al. | 106/119 |
| 3,511,600 | 5/1970 | Kim | 23/109 |
| 3,991,172 | 11/1976 | Wicke et al. | 423/637 |
| 4,226,839 | 10/1980 | O'Neill et al. | 423/177 |
| 4,382,911 | 5/1983 | Pennell et al. | 423/175 |
| 4,401,645 | 8/1983 | Gisler | 423/640 |
| 4,464,353 | 8/1984 | Hains | 423/640 |
| 4,472,370 | 9/1984 | Miyata et al. | 423/636 |
| 4,547,349 | 10/1985 | Lane | 423/164 |
| 4,636,379 | 1/1987 | Bestek et al. | 423/640 |
| 5,173,279 | 12/1992 | Dumont et al. | 423/640 |
| 5,223,239 | 6/1993 | Moran et al. | 423/640 |

FOREIGN PATENT DOCUMENTS

| | | |
|---|---|---|
| 327902 | 8/1989 | European Pat. Off. . |
| 3433228 | 4/1986 | Germany . |
| 3607819 | 1/1988 | Germany . |
| 633180 | 11/1978 | U.S.S.R. . |

OTHER PUBLICATIONS

V. P. Shaporev, et al., "Manufacture of calcium hydroxide with a large specific surface", Chemical Abstracts, vol. III, No. 18, abstract No. 156887r (Oct. 30, 1989).

Jozewicz, "Structural Changes During the Decomposition of Calcium Hydroxide," 6th Annual Int. Pittsburgh Coal Conference (1989) (no month available).

European Patent Office Supplementary European Search Report dated Jan. 13, 1994.

European Patent Office communication dated Feb. 2, 1994 including third party submission, with translation.

European Patent Office communication dated Mar. 8, 1994 including third party submission.

Jozewicz, "Correlation of SO₂ Reactivity with Structural Properties of Commerical Hydroxides," 1990 SO₂ Control Symposium, New Orleans, LA. (May 8–11, 1990).

(List continued on next page.)

Primary Examiner—Wayne Langel
Attorney, Agent, or Firm—Marshall, O'Toole, Gerstein, Murray & Borun

[57] ABSTRACT

Hydrated lime having high surface area and small particle size is prepared by hydrating lime with an aqueous hydration solution of an organic solvent, and preferably washing the resulting hydrate with an aqueous solution of an organic solvent prior to drying. The high surface area hydrates of the invention are excellent sorbents for SO₂ removal from gas streams.

5 Claims, 7 Drawing Sheets

OTHER PUBLICATIONS

Gullett, et al., "Effect of CaO Sorbent Physical Parameters Upon Sulfation,"1st Combined FGD and Dry $SO_2$ Control Symposium, St. Louis, MO. (Oct. 25–28, 1988).

Gullett, et al., "Pore Distribution Changes of Calcium–Based Sorbents Reacting with Sulfur Dioxide," AIChE Journal, vol. 33, No. 10, pp. 1719–1726 (Oct. 1987).

Staley et al., ASTM Proceedings, vol. 47, pp. 953–966 (1947).

Borgwardt et al., Ind. Eng. Fundam., vol. 25, No. 1, pp. 165–169 (1986).

Gooch et al., Proceedings: 1986 Joint Symposium on Dry $SO_2$ and Simultaneous $SO_2/NO_x$ Control Technologies, vol. 1, Chapter 11 (1986).

Bortz et al., Proceedings: 1986 Joint Symposium on Dry $SO^2$ and Simultaneous $SO^2/NO^x$ Control Technologies, vol. 1, Chapter 5 (1986).

Moran et al., Prep. Pap. Am. Chem. Soc. Div. Fuel Chem., vol. 32, No. 4, pp. 508–516.

Withum et al., Environ. Sci. Technology, vol. 23, pp. 821–827 (1989).

Rostam–Abadi et al., Final Technical Report to Center for Research on Sulfur in Coal (Dec. 1986) (Entire Report).

Rostam–Abadi et al., Final Technical Report to Center for Research on Sulfur in Coal (Aug. 1988), pp. ii and 1–2.

Rostam–Abadi et al., Final Technical Report to Center for Research on Sulfur in Coal (Aug. 31, 1989), pp. 1 and 3–6.

Rostam–Abadi et al., American Chemical Society, Division of Fuel Chemistry, vol. 25, No. 4, pp. 1418–1426 (Washington, DC—Aug. 26–31, 1990).

Schwarzkopf et al., "High Surface Area Hydrate—WUEL-FRAsorp®—Commerical Production and Application" in Walker et al., *Innovations and Uses for Lime* (1992) and earlier typeset version (undated).

Schwarzkopf et al., "Commercial Application of Dry FGD Using High Surface Area Hydrated Lime" in *The 1991 $So_2$ Control Symposium,* vol. 3, Sessions 7–8B (Dec. 3–6, 1991).

Zement–Kalk–Gips, vol. 9, pp. 262–275 (1956).

Zement–Kalk–Gips, vol. 11, No. 2, pp. 41–45 (1958).

Zement–Kalk–Gips, vol. 37, No. 10, pp. 530–533 (1984).

HIGH SURFACE AREA HYDRATED LIME AND METHOD OF REMOVING SO₂ FROM A GAS STREAM

CROSS-REFERENCE TO RELATED APPLICATIONS

This is a division of U.S. application Ser. No. 07/854,306 filed Mar. 20, 1992, now U.S. Pat. No. 5,223,239 issued Jun. 29, 1993 which is a continuation-in-part of International Application No. PCT/US91/05226 filed Jul. 24, 1991, which is a continuation-in-part of U.S. application Ser. No. 07/557,590 filed Jul. 24, 1990 and now abandoned, the respective disclosures of which are incorporated herein by reference.

BACKGROUND OF THE INVENTION

1. Field of the Invention

This invention relates generally to hydrated lime and methods of use thereof and, more particularly, the invention is directed to hydrated lime having favorable physical properties such as high surface area, high porosity, and small particle size, which in turn provide favorable $SO_2$ capture properties, and to methods of removing $SO_2$ from gas streams using the hydrated lime as a sorbent.

2. Description of Related Technology

Dry sorbent injection technologies offer many advantages over other systems, notably wet flue gas systems, for desulfurization in controlling the emissions of $SO_2$ produced during combustion of high sulfur coal. Some dry sorbent injection technologies, including furnace sorbent injection (FSI), boiler economizer injection, and post furnace duct-injection/humidification (Coolside) systems have been extensively researched.

A distinguishing factor of dry processes is the injection of a calcium-based sorbent such as hydrated lime ($Ca(OH)_2$) into different locations within a pulverized coal boiler unit. In FSI systems, calcium sulfate is formed by reaction of calcium oxide (CaO) (formed by calcining of calcium carbonate or calcium hydroxide) with $SO_2$. Under boiler economizer and Coolside conditions, $CaSO_3$ is the major product of the reaction between $Ca(OH)_2$ and $SO_2$.

A major objective of research has been to identify sorbent properties that result in enhanced $SO_2$ capture in order to reduce operating costs and the amount of waste products. In FSI systems, the superiority of calcium hydroxide over calcium carbonate as a sorbent has been attributed to the smaller mean particle size, higher surface area, higher pore volume, larger mean pore diameter, and plate-like grain structure (as opposed to sphere-like grain structure) of CaO derived from $Ca(OH)_2$ compared to that derived from calcium carbonate. In boiler economizer and Coolside studies, improved $SO_2$ removal performance has been reported for calcium hydroxide with high porosity, high surface area, and small particle size.

Thus, it is desirable to provide calcium hydroxide having high surface area, high porosity, and small particle size for use in $SO_2$ sorption, and for other physical processes relying on the sorptive capabilities of calcium hydroxide.

In the past, conventional hydrates of calcium produced by slaking lime (CaO) produced by burning limestone ($CaCO_3$) in a kiln have been limited with respect to these desirable physical properties. Such hydrates have been characterized as having surface areas in the range of about 10–25 $m^2/g$, mean particle diameters of about 1.7–10 micrometers, pore volumes in the range of about 0.1–0.25 cc/g, and crystallite sizes of greater than about 200 Angstroms (based on a+c axis dimensions). Several investigators have reportedly prepared small quantities of limes hydrated by contact with an aqueous alcohol solution having surface areas in the range of 35–50 $m^2/g$. Bestek, et al. U.S. Pat. No. 4,636,379 (Jan. 13, 1987) describes a seven-stage continuous methanol/water hydration process in which hydrates having surface areas in the range of about 35–55 $m^2/g$ are reportedly produced. These hydrates are believed to exhibit mean particle diameters of about 1 to about 2, and typically about 1.4, micrometers. Reportedly, very small quantities of hydrates having surface areas as high as 80 $m^2/g$ have been obtained by calcining dehydrating) commercial hydrated lime and rehydrating it using an alcohol-water hydration method.

There remains a need in the field for high surface area hydrated lime having all the necessary physical properties for efficient sulfur dioxide sorption, and for other purposes.

SUMMARY OF THE INVENTION

It is an object of the invention to overcome one or more of the problems described above.

According to the invention, hydrated lime having superior properties of high surface area, high porosity, and small particle size is provided.

In addition to the inventive high surface area hydrated lime the invention comprehends the methods of sorbing $SO_2$ from waste gas streams using the high surface area hydrated lime as a sorbent.

The invention allows the physical properties of hydrated lime to be controlled for optimum suitability for use in any of a variety of dry sorbent injection systems for $SO_2$ removal.

Other objects and advantages will be apparent to those skilled in the art from the following detailed description, taken in conjunction with the drawings and the appended claims.

DETAILED DESCRIPTION OF THE INVENTION

According to the invention, lime which has been prepared directly by calcining limestone is hydrated by contact with an aqueous solution of an organic solvent which is effective in retarding the rate of hydration ("slaking") of the lime. If desired, the product can be washed with another solution of an organic solvent in a post-hydration wash step in order to displace water before drying in order to further increase surface area and reduce particle size. The inventive method is capable of producing a hydrate with an $N_2$-BET surface area of greater than 35 $m^2/g$, and preferably greater than 55 $m^2/g$. Surface areas of up to 85 $m^2/g$ are readily obtainable.

Preferred organic solvents useful in the hydration and washing steps are lower alcohols, particularly methanol and ethanol. Throughout the following description, whenever reference is made to "alcohol" such reference is made to the preferred materials, but these teachings are to be understood to apply to useful organic solvents generally. The method of preparing the high surface area hydrates of the scope of the invention is not to be construed as being limited by such reference to the preferred alcohols.

Lime which has been prepared either commercially in a kiln at a high temperature and/or under high carbon dioxide concentration conditions or in a kiln, fluidized bed reactor, entrained flow reactor, or other calciner under conditions of low temperature and low carbon dioxide concentration conditions may be used as a starting material.

Figure 1:
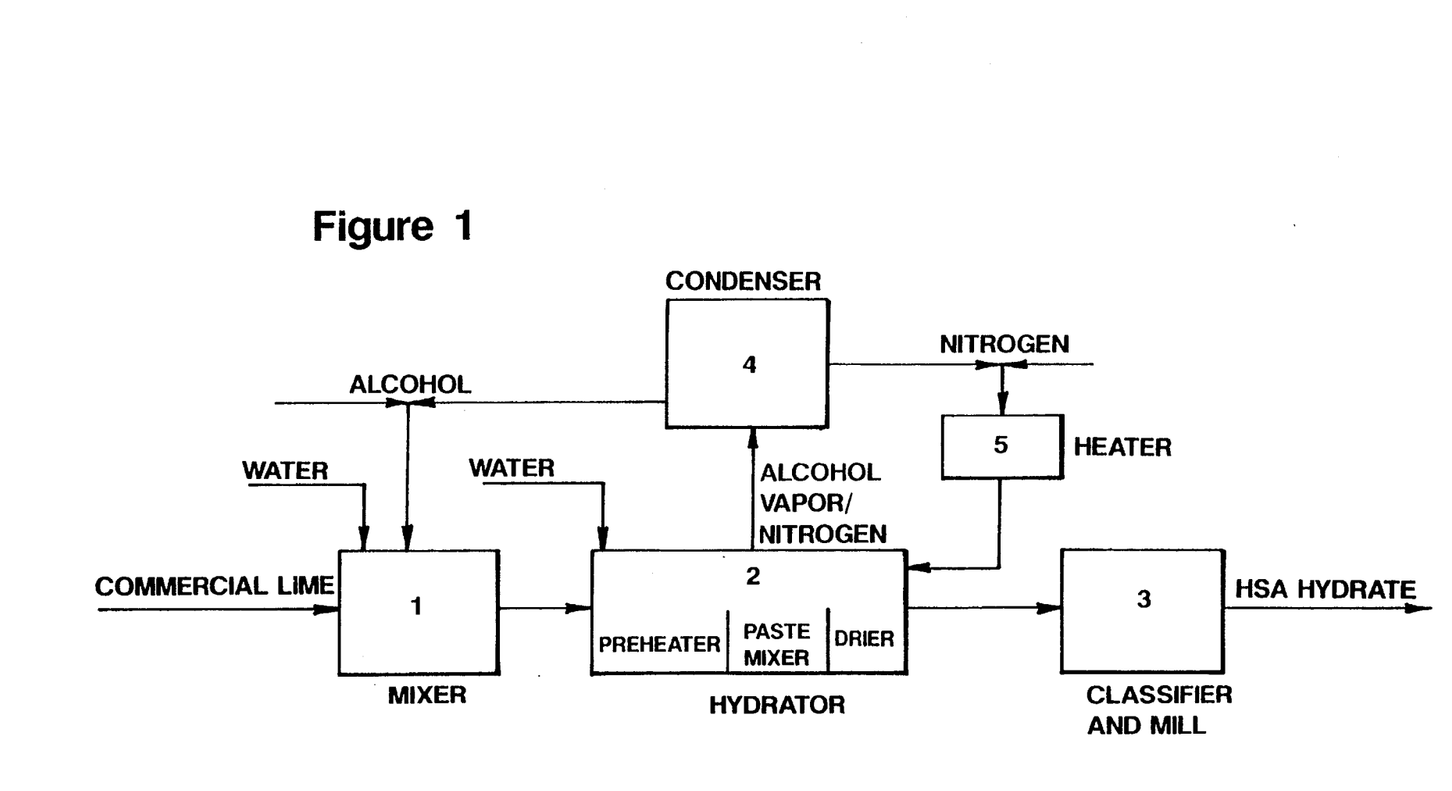
FIG. 1 is a schematic flow diagram of one embodiment of a process for preparing high surface area hydrated lime according to the invention.

FIG. 1 illustrates a process for hydrating lime using so-called "commercial" limes which are defined as being produced by calcining limestone in kilns in an environment having a relatively high (e.g., greater than 25 vol. %) $CO_2$ level and/or at high temperatures (i.e., above 1100° C.) at a residence time of about 1 to about 3 hours or higher, depending on the type of kiln.

According to the procedure of FIG. 1, lime (preferably minus 100 mesh in size) is mixed with an alcohol-water solution in a mixing stage 1 maintained at a temperature, preferably below about 40° C., which is sufficiently low to achieve a homogeneous slurry.

All or less than all, and preferably about 50%, of the water required in the process is added in the mixing stage. Any remaining portion of the water is added in the hydrator 2, located downstream. The alcohol-water solution required for the overall process need contain only a sufficient amount of water relative to the lime to result in a desired degree of hydration, usually at least 0.9 and preferably at least about 1 and less than about 2 times (highly preferably about 1.0 to about 1.4 times) the stoichiometric amount of water relative to lime and about 0.5:1 to about 5:1 (preferably about 1:1 to about 3:1) volumetric ratios of alcohol to water. For each kilogram of lime about 0.4 to about 4 liters (preferably about 0.8 to about 1.4 liters) of hydration solution is used.

Ratios of alcohol to water in excess of 5:1 may be used, especially with highly reactive limes, where hydration solutions may contain up to 75 to 85 vol. % alcohol, if desired. For example, with a hydration solution containing 85 vol. % alcohol, the alcohol to water ratio is about 5.67:1. Such high ratios of alcohol to water are especially suitable with limes having very high surface areas (e.g. 10 $m^2/g$ or more).

Thorough mixing of the hydration solution and the lime is important. High speed, intensive mixing is very helpful, and may be necessary with very reactive limes, for good heat transfer. For extremely reactive limes, cooling of the mixing vessel may be required. An alternative approach is to use a split water stream to minimize the rapid temperature rise when a highly reactive lime is processed. In embodiments using an alcohol wash step, greater amounts of water may be used, since it will be displaced in the wash step.

The alcohol or other solvent in the hydration solution retards the slaking rate, and maintains the temperature of the hydration mixture below the boiling point of water (thus preventing or minimizing the degree of gas phase hydration, which would inhibit surface area development). In addition, the use of alcohol or other solvents lowers surface tension and helps prevent agglomeration, which leads to increases in surface area due to increased dispersion. The solvent also lowers the solubility of the hydrate, thus promoting precipitation of hydrate from the solution of lime in water.

Hydroxyl carboxylic acids and/or surfactants or other additives may be used in combination with the alcohol in the hydration solution to further reduce the hydration rate, thus increasing hydrate surface area and decreasing hydrate particle size. Acid concentrations of 3 wt. % or less based on water are preferred, and concentrations of about 0.5 to 1 wt. % are highly preferred. Surfactant concentrations of 2 wt. % or less are preferred, depending on molecular weight, and concentrations in the range of 0.2 to 1 wt. %, and preferably less than 0.5 wt. % are typical.

Useful acids include lactic acid, glyceric acid, citric acid, maleic acid, tartaric acid, gluconic acid, and others. Useful surfactants include those of the Triton X series, sodium dodecyl sulfate, sodium abietate, Vinsol, etc. Acids are believed to function by inhibiting the growth of calcium hydroxide precipitates in order to affect the size and shape of the crystals. Surfactants function by sorbing onto the surface of the calcium hydroxide nuclei, and cause the crystals to better disperse by repulsion due to ionic or steric stabilization.

Other useful additives which affect hydration rates and hydrate properties include phosphates, borates, fluorides, sulfates, and silicates, as well as sugars (e.g. sucrose, glucose, etc.) and lignosulfonates which contain sulfonate and carboxylate groups.

The slurry from the mixing vessel 1 enters a hydrator 2 which may be integral with the mixer 1 and which can include a preheating stage, a paste mixing stage, and preferably a drying stage. The types of mixing elements (blades) used in each stage are selected to accomplish thorough mixing of the slurry, paste, and the powder phases present in the hydrator. The mixing stage 1 and the hydrator 2 can be incorporated into one vessel, or in separate single or multi-staged vessels, with or without internal walls to physically separate stages, as desired. Similarly, each of the preheating and paste mixing stages can be incorporated in one mixer/hydrator or hydrator vessel, or in separate single or multi-staged vessels, with or without internal walls. The drying stage can be accomplished in a separate vessel, preferably in a vacuum drier, or may be incorporated into a single vessel which includes the hydrator 2 and the mixer 1, if desired.

The remaining portion of the hydration water, if any, can be added in the preheating stage or in the paste mixing stage of the hydrator 2. In the preheating stage, the slurry is heated, autogenously or by external heating means, if necessary, to a temperature, preferably at least about 40° C. and up to about 70° C., which is sufficiently high to sustain the hydration reaction. The temperature may vary depending on the type of organic solvent used. The residence time in the preheating stage is typically between about 1 and about 10 minutes. In the paste mixing stage, the partially hydrated paste from the preheating stage is heated autogenously to the boiling point of the hydration solution due to the exothermic nature of the hydration reaction. Hydration temperature is dependent on the boiling point of the hydration solution. (Methanol boils at 64° C., and ethanol boils at 80° C. at atmospheric pressure.) The residence time in this stage is typically between about 3 and about 10 minutes. The crude product exiting the paste mixing stage is in powdered form.

In the drying stage, the crude product is heated, possibly autogenously (although heat may be applied from an external source, if necessary) to about 60° to about 110° C. for a residence time of about 3 to about 30 minutes. Additional hydration occurs during the drying stage with the final product typically containing greater than about 90 wt. % calcium hydroxide, depending on the purity of the lime. Greater than about 95% conversion of calcium oxide to calcium hydroxide requires greater amounts of water, which in turn leads to undesirable degrees of grit formation, and possibly to reduction in attainable surface area. About 90% conversion (hydration) is optimum for obtaining high surface area and small particle size.

The drying stage can be accomplished in a separate vessel (preferably a vacuum drier) to provide greater operating flexibility. The drying stage can also be accomplished in two separate vessels consisting of an atmospheric drier and a vacuum drier to improve alcohol recovery. If all of the hydration solution is driven off in the hydration stages, no drying stage separate from the preheating and paste mixing stages is needed.

Use of water at less than a 1.2 times stoichiometric ratio typically results in less than about 90% hydration. Operation at more than 1.5 times stoichiometric ratio of water can result in the production of large quantities of grit, depending on the ratio of hydration solution to lime. When an alcohol wash step is used (see FIG. 3), however, a stoichiometric ratio of 1.5 appears to result in optimum hydrate surface area.

For hydration solutions containing about 1.0 to about 1.4 stoichiometric amounts of water with respect to lime, low hydrate surface areas (less than 30 $m^2/g$) result when less than about a 1:1 volumetric ratio of alcohol to water is used. An alcohol to water ratio of greater than about 3:1 results in the production of soft agglomerates, which require milling. Surface area begins to decrease if alcohol to water ratios exceed about 6:1.

Total residence time in the hydrator is determined by the time required to evaporate hydration solution, which is a function of the reactivity (and thus surface area) of the lime and the amount of liquid present. Sufficient hydration solution should be present to prevent hydration temperatures from exceeding about 115° C.

At startup, the hydrator 2 is preferably provided with a flow of nitrogen or other inert gas to purge oxygen-containing gas from the hydrator. The nitrogen purge can also be used during operation to provide heat for the drying and/or preheating stages (if needed), maintain pressurization of the hydrator to about 1 to about 15 psig to prevent leakage of oxygen into the system, and remove the organic solvent vapor generated during operation. The solvent vapor/nitrogen stream enters a condenser 4 to recover and cool the solvent which is then recycled to the mixing vessel 1. The nitrogen stream exiting the condenser 4 is heated to about 80° to about 110° C. in a heater 5 and recycled to the hydrator 2.

Alternatively, or in addition, heating for the preheating and drying stages, if necessary, can be provided by external heating units, such as steam jackets.

The hydrate exiting the hydrator 2 can be subjected to an air classification and milling stage 3, if necessary, to separate any undesired grit particles formed during the hydration process. Thus, hydrates with surface areas between about 35 and about 50 $m^2/g$ and mean particle diameters between about 1 and about 3 micrometers are produced, depending on the hydration conditions and type and properties of the lime used.

The foregoing parameters, and those which follow, are derived from observations of batch mode operation, and while they may vary somewhat with continuous operation, are believed to be consistent with results obtainable under continuous operation conditions.

Figure 2:
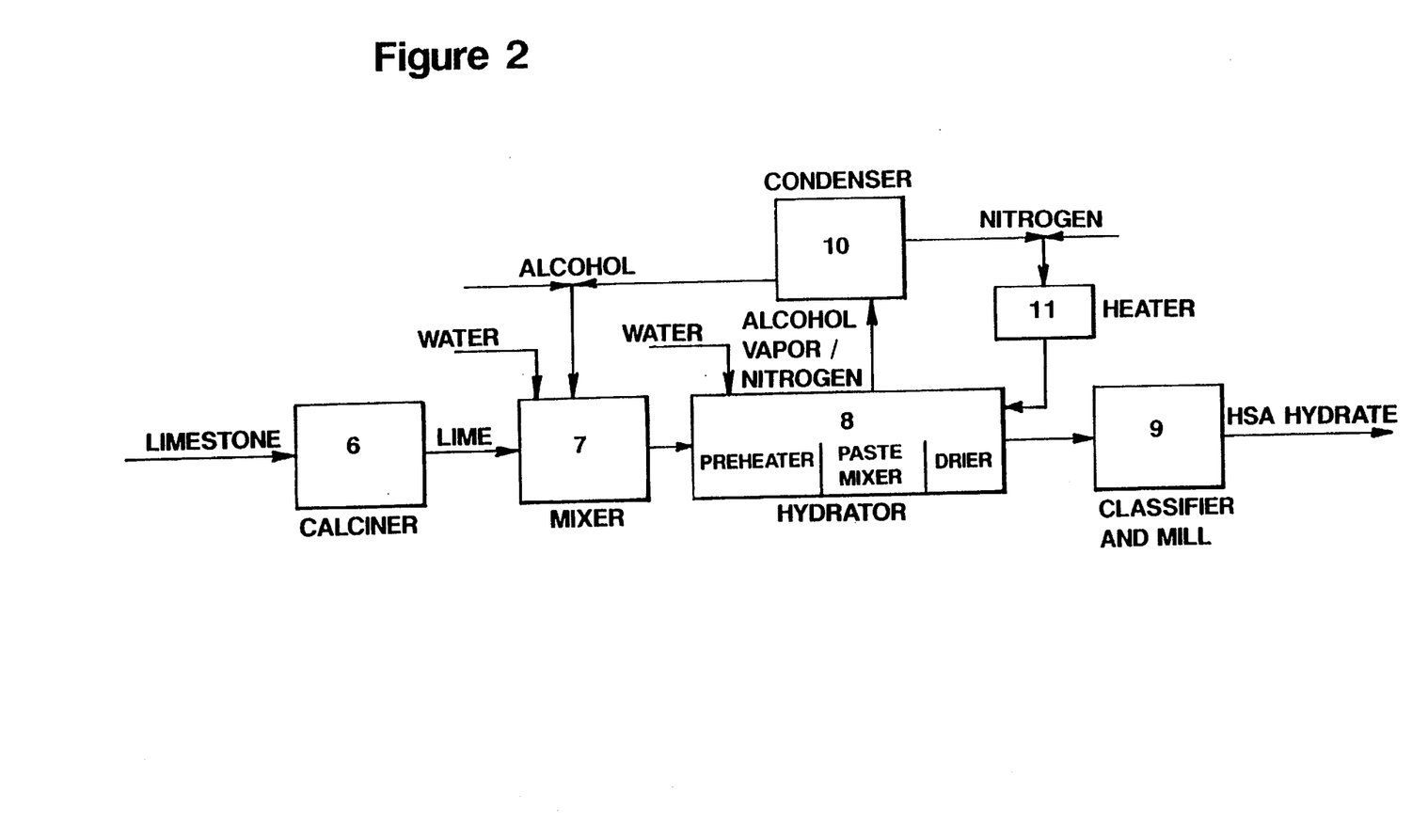
FIG. 2 is a schematic flow diagram of another embodiment of a process for preparing high surface area hydrated lime according to the invention.
Figure 3:
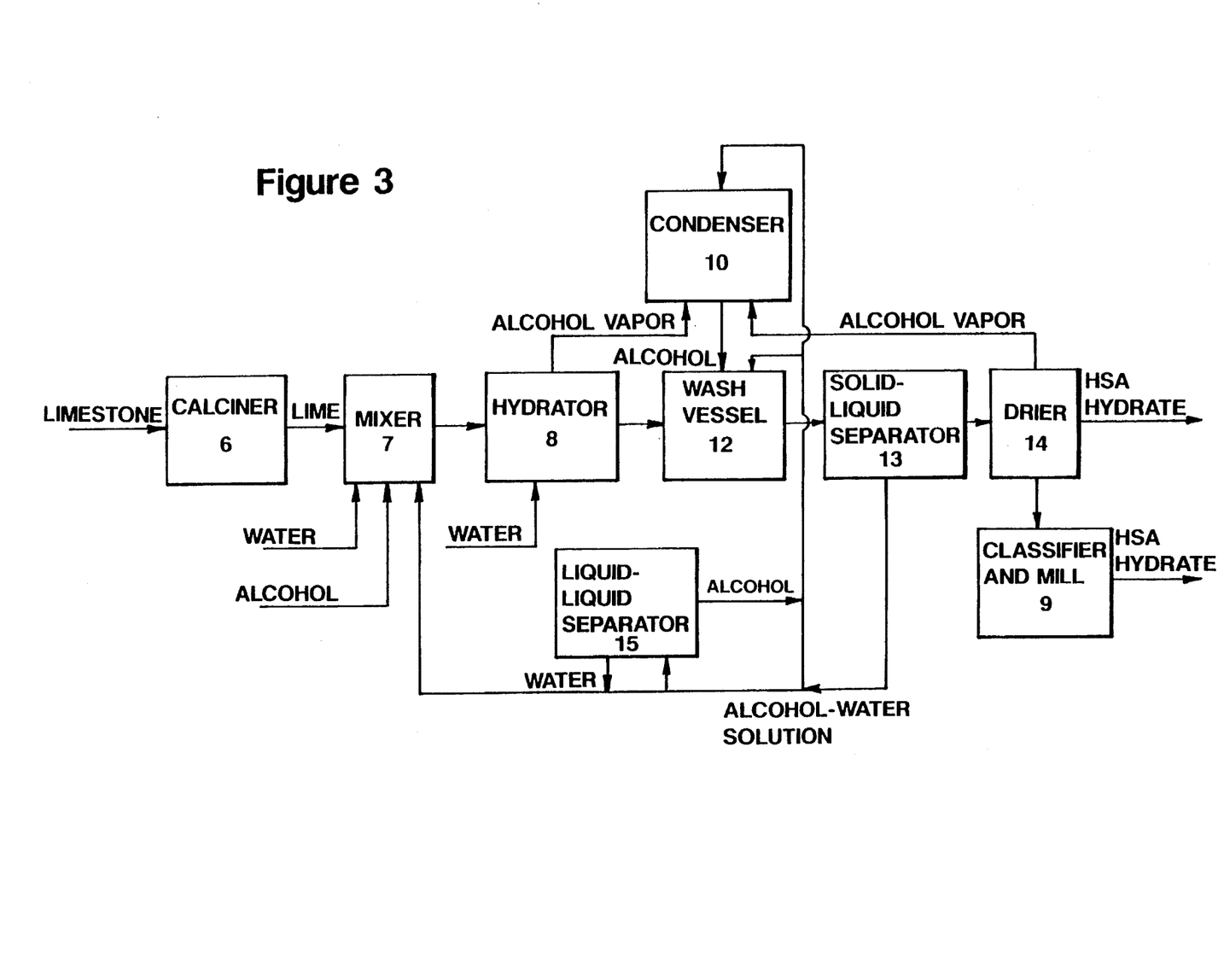
FIG. 3 is a schematic flow diagram of a modified form of the process of FIG. 2.

FIGS. 2 and 3 illustrate embodiments of methods of preparing the inventive high surface area hydrates wherein the hydrates are made using limes having relatively high surface areas, produced by calcining limestone under low temperature, low carbon dioxide conditions.

According to the embodiment of FIG. 2, higher surface area hydrates can be made using limes that are produced by calcining limestone (preferably greater than about 95% calcium carbonate) in a calciner 6, preferably at atmospheric pressure and for residence times of about 1 to about 3 hours at temperatures between about 800° and about 1100° C. (generally less than 950° C., preferably less than 900° C.) under a gas environment in which the partial pressure of carbon dioxide ($CO_2$) is as low as possible, i.e. below about 0.25 atmospheres (25 vol. %) (preferably below about 0.2 atmospheres (20 vol. %)) for calcinations carried out at atmospheric pressure. If desired, calcining may be carried out below atmospheric pressure. The percentage of calcium carbonate (preferably greater than about 95 wt. %) in the limestone from which lime is made is important to the ultimate hydrate surface area. Inert impurities, such as silicates, aluminum and iron oxides, and magnesium carbonates and oxides, do not hydrate and their presence lowers the surface area of the hydrated lime product.

Low $CO_2$ partial pressure and low calcination temperature conditions are ideal for producing, depending on the properties of the limestone feed, limes with $N_2$-BET surface areas at least about 2.5 $m^2/g$, and preferably at least about 3.5 $m^2/g$. The temperature and residence time are selected to minimize growth of crystallites (i.e. to minimize sintering). A fluid bed reactor (such as a circulating fluid bed reactor) or an entrained flow reactor are ideal for the calcination because of their excellent mass and heat transfer characteristics which allow calcination to be accomplished at low temperatures and at residence time comparable to those of commercial kilns. A commercial kiln operated at low temperatures and purged with air or an inert gas to dilute the $CO_2$ concentration can also be used. The limestone particle size preferably is minus 1 inch in size for a commercial kiln, minus 8 mesh in size for standard fluid bed reactors, and minus 50 mesh in size for circulating fluid bed and entrained flow reactors.

Calcination conditions (pressure, temperature, gas flow rate, $CO_2$ partial pressure, and residence time) needed to obtain lime with a given surface area are related to the reactor configuration and limestone properties. Several impurities in limestone such as aluminum oxides, iron oxides and alkali metals lower lime surface area during calcination due to their lowering of eutectic temperatures of calcium-based compounds (i.e., increased fluxing). For high purity limestone (greater than 98% calcium carbonate and less than 0.05% total alkali) the influence of calcination conditions on lime surface area is not critical.

Some calcination conditions may be varied (e.g. extremely high temperatures such as 1200° C. may be used) if other conditions (e.g. short residence times such as 1 to 10 seconds) are favorable. Selection of appropriate conditions is within the skill of those familiar with the art, guided by the present disclosure.

Hydrates may be prepared from the high surface area limes either without (FIG. 2) or with (FIG. 3) a post-hydration wash step.

As in FIG. 1, the mixing and hydrator stages of FIGS. 2 and 3 may be embodied in separate vessels or in a single vessel, and the preheating, paste mixing and drying stages of the hydrator can be formed in a single hydrator vessel (with or without internal walls to physically separate stages) which may also include the mixing stages, in particular when "commercial" lime is being processed. If preheating, paste mixing and drying stages are carried out in a such vessel without internal walls, a twin screw blade is preferred to transfer and blend the paste. Reference to the various stages by different reference numerals and illustration in the figures of separate mixing and hydrator vessels is exemplary only, and is not to be construed to limit the invention.

In FIG. 2, the lime (preferably minus 100 mesh in size) is mixed with an alcohol-water hydration solution in a mixing stage 7 maintained at a temperature (e.g., below about 40° C., preferably below about 30° C.) selected to produce a homogeneous slurry. All or less than all, preferably about 50%, of the water required in the process is added in the mixing stage 7, as described in the embodiment of FIG. 1. Any remaining portion of the water is added in the hydrator 8. The alcohol-water solution required for the overall process preferably should contain at least about 0.9 and preferably at least about 1 and less than about 2 times the stoichiometric amount of water (preferably about 1.0 to about 1.4 or about 1.1 to about 1.7 if a post-hydration wash step (FIG. 3) is used) and at least about 0.5:1, and preferably up to about 5:1 (highly preferably about 1:1 to about 3:1) volumetric ratios of alcohol to water. For each kilogram of lime about 0.4 to about 4 liters (preferably about 0.8 to about 1.5 liters) of solution is used. In general, a lower mixing temperature is preferred for more reactive limes. Surface area of hydrate tends to increase as mixing temperature is lowered. Lower temperatures also avoid thermal runaway due to the exothermic nature of the hydration reaction.

The slurry from the mixing vessel 7 enters a hydrator 8, which is similar to that of FIG. 1. However, little or no preheating by external means is needed to initiate the hydration reaction with high surface area limes due to their enhanced reactivity. (In such cases, an external heat source may be used, if desired, to assist in drying.) The remaining portion of the hydration water, if any, can be added in the preheating stage or in the paste mixing stage of the hydrator. The temperatures in the hydrator are between about 40° and about 70° C. in the preheater stage, between about 60° and about 80° C. in the paste stage, and between about 80° and about 110° C. in the drying stage, depending on the type of solvent used. Residence times ranging between about 5 and about 30 minutes in the hydrator, depending on the reactivity of the lime and type and amount of solvent used, are typical. The drying stage is similar to the embodiment of FIG. 1. The drying stage is not required if the hydrate is to be processed using a post-hydration wash step.

At startup, the hydrator 8 is preferably provided with a flow of nitrogen or another inert gas to purge oxygen-containing gas from the hydrator, similar to the embodiment of FIG. 1. The nitrogen purge can also be used during operation to provide heat required for the drying and/or preheating stages, maintain pressurization of the hydrator to about 1 to about 15 psig to prevent ignition of the organic solvent, and remove the organic solvent vapor generated during operation. The solvent vapor/nitrogen stream enters a condenser 10 to recover and cool the solvent which is then recycled to the mixing stage 7. The nitrogen stream exiting the condenser 10 is heated to about 80° to about 110° C. in a heater 11 and recycled to the hydrator 8. Alternatively, or in addition, heating for the preheating and drying stages, if necessary, could be provided by external heating units, such as steam jackets.

Thus, hydrated lime with a surface area of about 50 to about 80 $m^2/g$ is prepared depending on the surface area of the lime feed and hydration conditions. The crude product obtained can be classified and milled at 9 to separate undesirable grit particles formed during hydration.

The reactivity of the hydrate can be further enhanced by using a post-hydration wash step to displace water prior to drying to further increase surface area and reduce particle size, as described below in connection with FIG. 3.

Retained water will inhibit surface area development due to agglomeration and recrystallization, and may result in pore structure collapse during drying.

Also, displacement of water prior to drying helps avoid undesirable gas phase (steam) hydration. The use of a wash step allows the use of greater amounts of water during hydration, if desired, in order to increase the degree of hydration, since the wash step displaces excess water before drying. The wash step also provides rapid cooling of hydrated material, which is beneficial since high temperature soaking of hydrates in liquid is detrimental to surface area development.

FIG. 3 depicts an alternative to the embodiment of FIG. 2 using a post-hydration wash step, and uses common reference numerals to represent elements which are common to both embodiments. In FIG. 3, however, the hydator 8 does not include a drying stage. The nitrogen purge line and heater are not shown in FIG. 3, but may be utilized, if desired, for the purposes used in the embodiments of FIGS. 1 and 2.

The hydrate prepared according to the embodiment of FIG. 2 without drying, classification, and milling, is washed in a vessel 12 with about 0.7 to about 4.5 liters of about 70 to about 98% by volume (preferably 90–95 wt. %) alcohol (or other organic solvent) solution per kilogram of hydrate (about 1 to about 6 liters per kilogram of feed lime). The alcohol may but need not be the same type of alcohol used in the hydration step. It is preferred, however, to use the same type of alcohol in both steps, in order to avoid an additional separation step. A surfactant or other dispersing agent could also be added during the wash step to further reduce the hydrate particle size.

The wash step is carried out at atmospheric pressure or slightly above and at a temperature sufficiently low to avoid recrystallization of hydrate crystals, preferably at about 30°–50° C., highly preferably at less than about 40° C., for about 15 to 60 minutes in a single stage vessel, or in multiple stages for shorter time periods in each stage.

Low temperatures are preferred during the wash step to prevent reaction of alcohol with hydrate, and recrystallization of hydrate. It is important that the wash liquid contain at least about 1–2 vol. % water, in order to avoid the undesirable reaction of calcium with alcohol to produce calcium alkoxides. The presence of even small amounts of water in the wash liquid pushes the alkoxide formation reaction to the left, minimizing or eliminating consumption of alcohol, thereby improving the economics of the process. High concentrations of alcohol (greater than about 90%) minimize the amount of separation needed for recycle.

The crude product enters a single or multistage solid-liquid separator 13 (such as a centrifuge) for no more than 30 minutes to separate the alcohol solution from the hydrate, preferably to below 20 wt. % liquid. The crude product then enters an atmospheric or vacuum drier 14 operating at temperatures between about 60° to about 110° C., preferably 60°–80° C. The drier may be purged with nitrogen or other inert gas to enhance the transport of alcohol vapor from the drier to the condenser 10. The hydrate exiting the drier can be air classified and milled at 9 to reduce its mean particle diameter. The final hydrated lime product typically has a surface area of about 50 to about 85 m²/g depending on the surface area of the lime feed and conditions during hydration (8) and washing (12).

The alcohol-water solution from the solid-liquid separator 13 is recycled to the mixing vessel 7, to the wash vessel 12, and to the condenser 10, which in FIG. 3 is a scrubber. Vapors from the hydrator 8 and the drier 14 also enter the scrubber 10 for recovery of alcohol. Depending upon the flow rates and temperatures of the vapor streams and alcohol-water stream entering the scrubber 10, some cooling will be necessary to ensure complete condensation of the alcohol vapor as well as to achieve the proper temperature (below 40° C.) of the alcohol-water stream entering the wash vessel 12.

Under certain hydration conditions, depending on the alcohol-water ratio in the hydration solution, the amount of excess water used during hydration, and composition of the alcohol vapors entering the scrubber 10, the liquid recycle stream entering the scrubber may have to be adjusted to maintain the proper concentration of alcohol (70 to 98 vol. % purity) in the wash step. If needed, a liquid-liquid separator 15 is used to separate alcohol from the solution for a portion of the recycle stream entering the mixing stage 7. The concentrated alcohol stream is added to the scrubber recycle stream to increase the alcohol concentration. The water stream is recycled back to the mixing stage 7. The liquid-liquid separator 15, if needed, may be a distillation unit (vacuum, flash, or atmospheric), or a reactor in which a solid material is used to preferentially adsorb or react with water. A liquid-liquid separation step is not needed if the concentration of alcohol in the liquid stream exiting the solid-liquid separator 13 is sufficiently high.

In the process described, less than 3% alcohol (usually less than 1%) will typically be consumed during the hydration step. Any other losses are due to other processing steps (leaks, etc.). Therefore, consumption of alcohol is minimal.

FIG. 3 illustrates the use of a post-hydration wash step wherein the feed lime has relatively high surface area, and is produced by calcining limestone under conditions of low temperature and low carbon dioxide concentration. The wash step can also be used in processing of "commercial" limes (as in FIG. 1), if desired, and may reduce the particle size and, possibly, increase the surface area of the resulting hydrate.

The use of lime produced in calciners operating at low temperatures under low $CO_2$ condition and/or the post-hydration washing step enhances surface area of hydrated lime, while the use of the multi-stage reactor configuration according to the embodiment of FIGS. 1 and 2 results in fewer processing steps and greater simplicity and flexibility than prior high surface area hydrated lime preparation methods.

If desired, mixing and hydration can be carried out in the same reactor at varying temperatures along the length of the reactor, especially if the reactor has plug flow characteristics or if relatively low reactivity "commercial" limes are utilized.

Whether the premixing and hydration stages are carried out in separate vessels or in a single vessel, or whether or not the stages of the hydrator are separated, the water/alcohol hydration solution (or the components thereof) may be introduced to the system separately from each other. For example, hydration water may be introduced in two (or more) separate streams to the mixing stage 1 or 7 and the hydrator 2 or 8 as shown in FIGS. 1–3 when either commercial lime or high surface area, relatively reactive lime is being processed, and this procedure may be particularly desirable when relatively reactive limes are used. In any case, introduction of the second (downstream) water stream should preferably occur at a point in the system before the lime/hydration solution mixture reaches the boiling point of alcohol or other organic solvent.

If desired, and in particular with highly reactive limes, lime may be mixed in the premixing stage with a hydration solution that contains all the necessary alcohol and about 5 to 35% of the hydration water with separate, preferably downstream addition of the remaining water to the hydrator. Alternatively, dry lime and an alcohol/water mixture may be introduced separately to the mixing or preheating stages of the hydrator. This scheme is preferable when the mixer 7 and hydrator 8 are combined into a single vessel. An advantage of this method of feeding dry lime is that particle size of feed lime is not limited to below about 100 mesh and lime particles as large as three inches can be routinely fed into the reactor.

Thus, the advantages of the present invention over the prior art include (1) the preparation of hydrates having surface areas of at least 50 m²/g, generally in the range of 55 to 85 m²/g compared to only 35 to 55 m²/g reported in some prior art; (2) the preparation of hydrates of comparable or improved physical properties (such as high surface area, small particle size and high porosity) compared to those of the prior art using fewer processing steps than prior art processes; and (3) the preparation of hydrates whose surface areas (80 m²/g) are comparable to those of prior art hydrates, which are prepared using relatively expensive and more complicated processes.

One important characteristic of the high surface area hydrates of the invention is the provision of both high surface area and small particle size, which is an important factor in $SO_2$ sorption and other applications where sorption efficiency is important.

In particular, the invention provides means for optimizing the surface area and other physical properties of hydrated lime for $SO_2$ capture in a simple, commercially practical process. By the use of relatively reactive limes (i.e., those having surface areas of at least 2.5 m²/g and up to about 30 m²/g, typically up to about 10 m²/g) the need for external preheating is eliminated or minimized. The process may be conveniently carried out in a single reaction vessel with advantageous use of a post-hydration wash step, staged hydration (split water streams), high concentrations of organic solvent (e.g., 75–85 vol. %) in the hydration solution, and the use of hydration solution additives to maximize product surface area, and the flexibility to use pebble lime in the hydration process.

Ideally, the process integrates the use of highly reactive lime feed, organic solvent-water hydration in a single reactor vessel without the use of an external heat source to initiate or maintain the hydration reaction, and an organic solvent wash step.

Judicious selection of feed lime properties and hydration conditions allows the hydrate product to be tailored for the type of dry sorbent injection system with which the sorbent is intended to be used.

EXAMPLES

The practice of the invention will be illustrated by the following specific examples, which are not to be understood

Example 1

Table 1 presents physical properties of eighteen hydrated limes (designated A–O, HSA1, HSA2 and HSA3) that were prepared from two commercial limes made by burning limestone in a kiln under high temperature and $CO_2$ conditions, from one lime made by processing limestone in a rotary kiln under low temperature and $CO_2$ conditions, and from six limes made by processing limestone in fluidized bed reactors under low temperature and $CO_2$ conditions. The hydrated limes made from fluidized bed lime were prepared with and without a post-hydration alcohol wash step. Table 1 also presents surface area and crystallite size data for a hydrate (HSAG) made according to the procedure of Bestek U.S. Pat. No. 4,636,379.

Chemical compositions of sorbents were determined by X-ray fluorescence. Surface areas were obtained by $N_2$-adsorption in conjunction with the one point BET method. Pore volumes and pore size distributions (pores smaller than 0.25 micrometers) were determined by nitrogen adsorption. Sorbent particle size analyses were performed on a Micromeritics Sedigraph 5100 particle size analyzer with particles dispersed in Sedisperse brand dispersant in an ultrasonic bath prior to particle size measurement. The HSA hydrates were examined by X-ray diffraction (XRD) and the data were used for determination of crystallite size using the Scherrer equation.

The commercial hydrates A and B were prepared by water hydration. Hydrate surface area ranged from 20 to 25 $m^2/g$, and mean hydrate particle size ranged from 1.7 to 3.5 micrometers.

Inventive hydrates C and D were made from commercial limes by hydrating with a 1.2 stoichiometric ratio of water to lime and a volumetric ratio of ethanol to water of 2:1 with maximum temperatures below 15° C. More particularly, in each case 1.82 kg lime was hydrated with a solution comprising 0.70 liter water and 1.40 liter ethanol. No alcohol wash step was used. Hydrate surface area in each case was about 40 $m^2/g$, with a mean particle diameter of 1.0–2.7 micrometers.

Hydrate E was made from lime produced in a continuous rotary tube kiln. The kiln had an inner diameter of 4 inches and a length of 72 inches, and was heated by a three-zone furnace rated at 2000° F. (1092° C.). The limestone, 8×50 mesh, was calcined at 1800° F. (982° C.) for 30 to 60 minutes under 5 l/min (STP) nitrogen purge. The limestone feed rate was 1.6 kg/hour. 1.82 kg of the resulting lime was hydrated at maximum temperatures below 115° C. with a hydration solution comprising 0.70 liter of water and 1.70 liter ethanol. The surface area of the resulting hydrate was 50–55 $m^2/g$ with a mean hydrate particle diameter of 0.7–1.0 micrometers.

Hydrates were also made from lime prepared by calcining limestone in a fluidized bed reactor. These hydrates were made without (hydrates F–J) and with (hydrates K–O) an ethanol wash step.

For each of hydrates F–O, 60 gram samples of 16×40 mesh limestone were heated in a 1 inch ID batch fluidized bed reactor at a rate of 20° C./min to a calcination temperature of 880° C. and held at this temperature for 60 minutes. The limes were produced under a nitrogen purge flowing at a rate of 3 l/min (STP).

In the preparation of hydrates F–J, 5 gram samples of lime were hydrated at maximum temperatures below 115° C. with a hydration solution using a stoichiometric water to lime ratio of 1.2, except in the case of hydrate H which used a 1.5 stoichiometric ratio, and a volumetric ethanol to water ratio of 2:1. (In each case other than sample H the hydration solution contained 1.9 ml water and 3.8 ml ethanol. For sample H, the hydration solution contained 2.4 ml water and 4.8 ml ethanol.)

For samples F–J, surface area ranged from 70–79 $m^2/g$.

Samples K–O were prepared by hydrating limes at a stoichiometric water to lime ratio of 1.5 and an ethanol to water volumetric ratio of 2:1 at maximum temperatures below 115° C. In each case, the hydration solution contained 2.4 ml water and 4.8 ml ethanol.

Immediately following hydration, each moist hydrate was washed in 20 ml anhydrous ethanol (4 liters per kilogram of lime) at a temperature of 20° to 40° C. Hydrate surface areas ranging from 79–84 $m^2/g$ were obtained.

The results for samples A–J illustrate the effect of calcination conditions on the physical properties of hydrated lime.

The surface areas of hydrates made from commercial Burlington lime were about 40 $m^2/g$ compared to 50–55 $m^2/g$ for rotary kiln lime and 70–79 $m^2/g$ for FBR limes. Hydrates prepared using a post-hydration wash step exhibited higher surface areas, depending on the hydration conditions, and in separate tests were determined to have higher sulfur capture capacities (60 minutes sulfation time at 850° C.) than hydrates prepared without the wash step.

The HSA1, HSA2 and HSA3 samples were made in a bench-scale hydrator which has the capacity to produce up to seven pounds of hydrated lime per batch. For preparation of each of these samples, 1.82 kg of lime was introduced to the reactor. The hydration solution containing 1.2 to 1.3 times stoichiometric water (1.2 to 1.3×$H_2O$) and 2.0 to 2.5 volumetric ratio of ethanol to water (A:W=2.0 to 2.5) was then added to the hydrator at room temperature.

Due to the differences in reactivity of the three limes used to produce HSA1, HSA2 and HSA3, slightly different hydration solutions and methods were used to produce each hydrated lime product. The conditions which were selected to make the products were 1.3×$H_2O$ and A:W=2.0 for Salem lime (HSA3), 1.2×$H_2O$ and A:W=2.4 for Burlington lime prepared in a rotary kiln at 1800° F. (HSA1), and 1.2×$H_2O$ and A:W=2.5 for Shasta lime prepared in a fluidized bed reactor at 1650° F. (HSA2).

During production of HSA1 and HSA2 (which were prepared from extremely reactive limes), all of the alcohol and 50% of the water were added to the lime initially to allow 30 to 60 seconds for the slurry to be homogenized before adding the remaining 50% of the water. After adding the first 50% of the water, the temperature typically rose 10° to 20° C., while after the second water addition, the temperature very quickly rose to the boiling point of the solution. During these two hydration tests, no external heating was required to start the reaction, although external heat was provided after the completion of hydration to insure that the final products were dry. During the tests performed with the commercial Salem lime, external heating was required to initiate the reaction.

For these three tests, the products were dried at a temperature of about 110° C. for about fifteen minutes and were then cooled to about 60° to 80° C. The products were then ejected into a filter bag and transferred into plastic containers to be shipped to the site of the dry sorbent injection facilities.

TABLE 1

Properties of Hydrated Lime Samples

| Hydrate | Limestone | Lime Surface Area (m²/g) | Stoichiometric Water | Ethanol-Water Ratio (V:V) | Ethanol Wash (l/kg lime) | Hydrate Surface Area (m²g) | Mean Hydrate Particle Size (micrometers) | Pore Volume (cc/g) | Crystallite Size (Angstroms) |
|---|---|---|---|---|---|---|---|---|---|
| Commercial Hydrates | | | | | | | | | |
| A | Burlington | 1.6 | NA | 0 | 0 | 20 | 2.5–3.5 | 0.16 | 220 |
| B | Salem | 1.8 | NA | 0 | 0 | 20–25 | 1.7–3.1 | 0.17 | NA |
| Hydrates Made From Commercial Limes | | | | | | | | | |
| C | Burlington | 1.6 | 1.2 | 2:1 | 0 | 40 | 1.0–2.7 | NA | 150 |
| D | Salem | 1.8 | 1.2 | 2:1 | 0 | 41 | 1.0–1.5 | 0.18 | NA |
| Hydrates Made From Rotary Kiln Lime | | | | | | | | | |
| E | Burlington | 3.5 | 1.2 | 2.4:1 | 0 | 50–55 | 0.7–1.0 | 0.25–0.30 | 140 |
| Hydrates Made From Fluidized Bed Lime | | | | | | | | | |
| F | Burlington | 17 | 1.2 | 2:1 | 0 | 79 | NA | 0.45 | NA |
| G | Salem | 18 | 1.2 | 2:1 | 0 | 76 | NA | NA | NA |
| H | Shasta | 28 | 1.5 | 2:1 | 0 | 76 | NA | NA | NA |
| I | Fredonia | 17 | 1.2 | 2:1 | 0 | 70 | NA | NA | NA |
| J | Rogers City | 14 | 1.2 | 2:1 | 0 | 75 | NA | NA | NA |
| Hydrates Made From Fluidized Bed Lime Using Wash Step | | | | | | | | | |
| K | Burlington | 17 | 1.5 | 2:1 | 4 | 79 | NA | NA | NA |
| L | Salem | 18 | 1.5 | 2:1 | 4 | 80 | NA | NA | NA |
| M | Shasta | 28 | 1.5 | 2:1 | 4 | 84 | NA | NA | NA |
| N | Fredonia | 17 | 1.5 | 2:1 | 4 | 79 | NA | NA | NA |
| O | Rogers City | 14 | 1.5 | 2:1 | 4 | 79 | NA | NA | NA |
| Hydrates Prepared for SO₂ Removal Tests | | | | | | | | | |
| HSA1 | Burlington[a] | 3 | 1.2[c] | 2.4 | 0 | 45–50 | 0.7 | 0.26 | 160 |
| HSA2 | Shasta[b] | 7 | 1.2[c] | 2.5 | 0 | 60–65 | 0.8 | 0.36 | 140 |
| HSA3 | Salem | 1.8 | 1.3 | 2.0 | 0 | 35–40 | 1.1 | 0.18 | 150 |
| HSAG | Bestek | NA | NA | NA | NA | 40 | NA | NA | 140 |

[a] lime prepared in rotary kiln calciner (1800° F.)
[b] lime prepared in fluidized bed reactor (1650° F.)
[c] split water - 50% initially and 50% after 10–20° F. temperature rise

Example 2

Comparison Between Inventive Hydrated Lime and the Prior Art

Typical properties of commercial hydrates, hydrates of the invention and those reported in Bestek U.S. Pat. No. 4,636,379 are summarized in Table 2. In addition to having higher surface areas, the inventive hydrates have smaller mean particle diameters, higher pore volumes and smaller calcium hydroxide crystallite size than those of the prior art. The enhanced properties of the HSA hydrate make this material a superior sorbent for controlling the emission of sulfur dioxide (SO$_2$).

TABLE 2

Typical Properties of Commercial and Inventive Hydrated Lime

|  | Invention | Commercial | U.S. Pat. No. 4,636,379 |
|---|---|---|---|
| Surface area (m²/g) | 35–85 | 10–25 | 35–55 |
| Mean particle diameter (micrometers)* | 0.5–2.5 | 1.7–10 | NA |
| Pore volume (cc/g) | 0.25–0.6 | 0.1–0.25 | NA |
| Crystallite size** (Angstroms) | 140–160 | 220 | 140 |

*Measured by Sedigraph particle size analyzer.
**Measurements based on a + c axis measurements.

Example 3

Production of Optimum HSA Hydrated Lime for Various Dry Sorbent Injection Processes Effect of Feed Lime Properties and Hydration Conditions on Hydrated Lime Production and Properties The parameters of hydration conditions, the choice of reactor type, and the properties of feed lime are important for production of hydrates with desired properties (surface area, particle size, and flow characteristics). These parameters influence the shape of the temperature profile (temperature history) which the reactants are subjected to during preheating and hydration stages.

Figure 4:
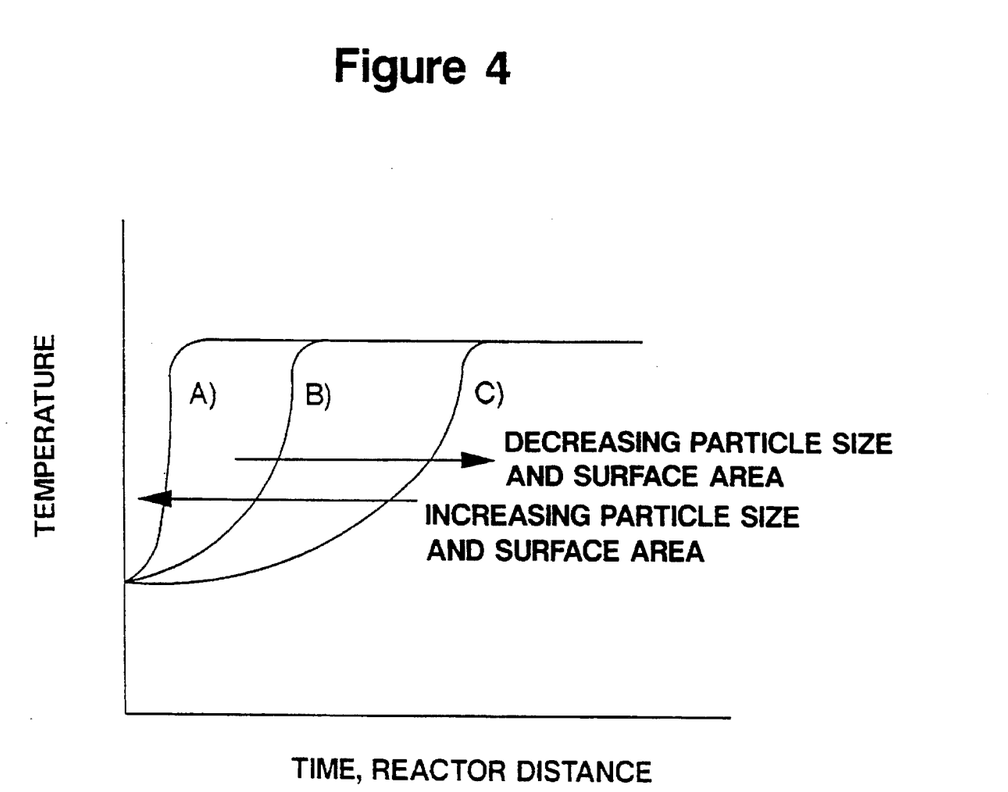
FIG. 4 is a graphical depiction illustrating the effect of the processing temperature profile on the physical properties of high surface area hydrated lime products.

In FIG. 4, three temperature profiles (temperature vs. reactor distance) are shown. In general (at a given alcohol to water ratio), except as noted below, conditions which shift the profile to right decrease hydrate particle size and surface area; conditions which shift the profile to left increase surface area and particle size. The profile can be shifted to the left by using:

1) more reactive lime, i.e., high surface area lime;
2) less alcohol (for a given lime, however, this would decrease surface area and increase particle size;
3) a continuous stirred tank reactor to obtain a sudden temperature rise of the reactant (thermal shock); and,
4) a reaction accelerator.

The profile can be shifted to the right by using:

1) less reactive lime;
2) more alcohol (this results in increased surface area and decreased particle size, depending on A:W ratio);
3) reaction inhibitors;
4) gradual heating of reactants in a reactor, similar to the approach of U.S. Pat. No. 4,636,379 where a preheating stage is used before a hydration reactor; and,
5) controlled temperature rise of reactants by staged water addition.

Figure 5:
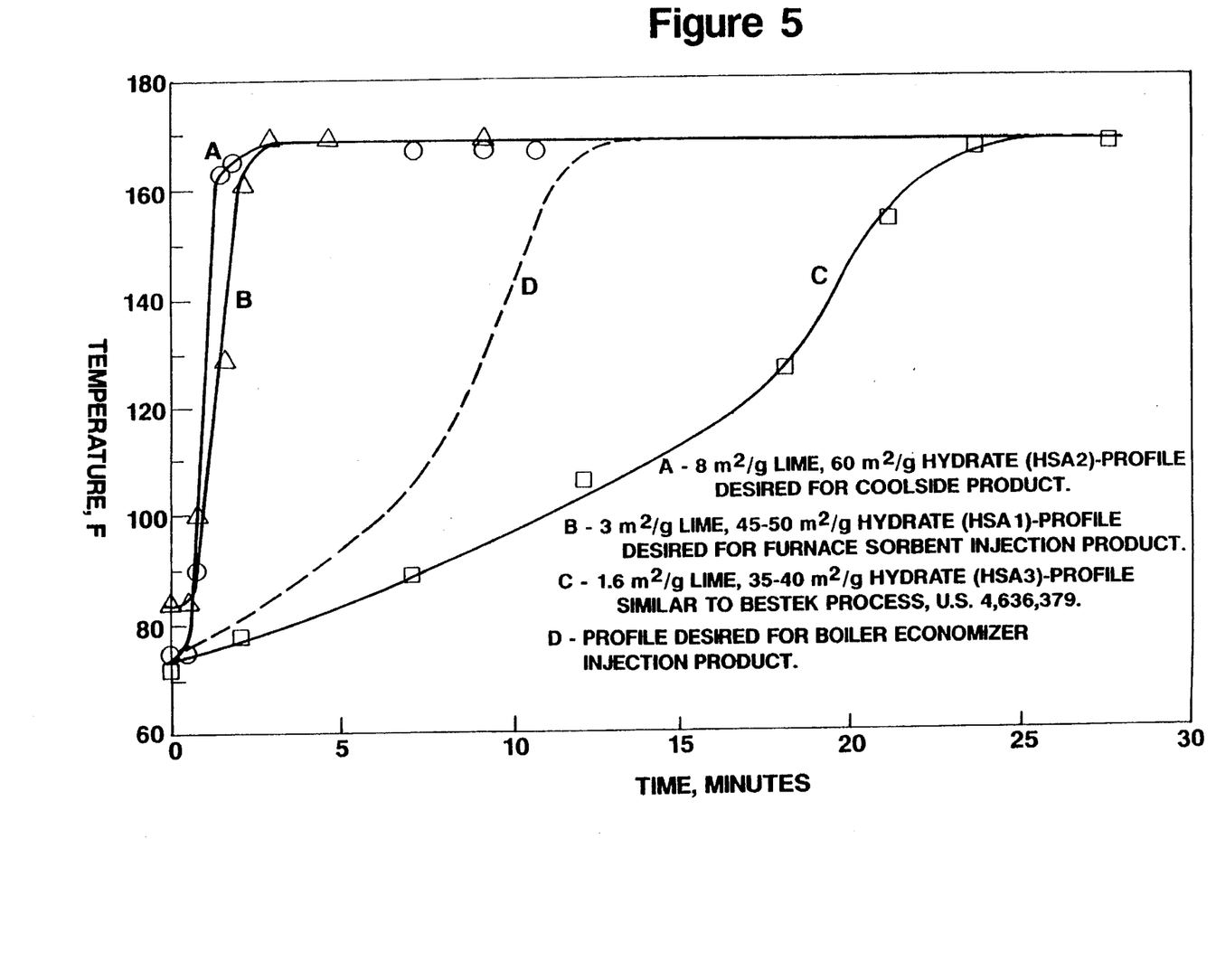
FIG. 5 is a graphical depiction of temperature profiles obtained in processing several different limes into hydrates.

The profiles shown in FIG. 5 were obtained during production of HSA1, HSA2 and HSA3 (see Example 1 and Table 1) according to the invention in a batch reactor. The hydrates were tested in pilot-scale systems under Coolside, boiler economizer, and furnace sorbent injection conditions.

Overview of Dry Sorbent Injection Processes

In dry $SO_2$ removal processes, the sorbent powder reacts with $SO_2$ to form a dry product which is removed in the particulate collector. Three general approaches are available or under development for bringing calcium-based sorbents into contact with the $SO_2$:

1. Furnace injection of calcium carbonate, calcium oxide, or calcium hydroxide at temperatures between 1100° and 1250° C. (2012°–2282° F.).
2. Economizer injection of calcium hydroxide at temperatures between 450° and 550° C. (842°–1022° F.).
3. Post furnace injection of calcium hydroxide into combustion products at high relative humidity at temperatures between 50° and 250° C. (122°–482° F.) (Coolside process).

A brief summary of the chemistry of each process is given below.

Furnace Dry Sorbent Injection

When hydrated lime is used as a sorbent, the following two-step reactions occur:

$$Ca(OH)_2 \rightarrow CaO+H_2O \tag{1}$$

$$CaO+SO_2+\tfrac{1}{2}O_2 \rightarrow CaSO_4 \tag{2}$$

The rate of sulfur capture depends on complex interactions between sulfation kinetics, sintering, and build up of a $CaSO_4$ product layer barrier.

Since CaO is porous, the $SO_2$ reaching the surface must diffuse through the CaO pores. As sulfation proceeds, $CaSO_4$ builds up on the CaO surface, which requires that the $SO_2$ diffuses through the $CaSO_4$ to reach unreacted CaO. It is generally accepted that sulfation can be limited by any of the following processes:

1. Bulk diffusion of $SO_2$ to the particle.
2. Diffusion of $SO_2$ through the pores.
3. Diffusion of $SO_2$ through the $CaSO_4$ layer.
4. Filling of the small pores, causing a decrease in reactive area (pore plugging).
5. Build up of $CaSO_4$ at the entrance of a pore causing pore closure.
6. Loss of surface area due to sintering.
7. Reduced kinetic reaction rates at low temperatures.

Typically, the rate is limited by either internal or external diffusion processes. For high sulfur coal applications, diffusion of $SO_2$ across the product layer (due to the increase in molar volume when converting from CaO to $CaSO_4$, i.e., 16.9 vs. 48 cm$^3$/mole) limits the ultimate calcium utilizations which are achievable. At lower $SO_2$ levels, the resistance due to bulk diffusion of $SO_2$ to the particle surface approaches that of the product layer diffusion.

Physical properties of the calcined sorbent will influence its ability to capture $SO_2$. Indeed, investigators have shown a generally consistent trend of increasing utilization with increasing CaO surface area, at least up to 40 m$^2$/g. Attempts to increase utilization by increasing the area of the raw hydrates up to 80 m$^2$/g have not been successful due to a square law dependence of sintering (step 6) and hence loss of surface area at typical furnace injection temperatures. Particle size also significantly influences $SO_2$ removals. Laboratory tests conducted under FSI conditions at 1100° C. with CaO derived from $Ca(OH)_2$ have revealed that CaO conversion to $CaSO_4$ in inversely related to particle diameter to the 0.2 to 0.35 power. Studies have shown that reduction in particle size from 10 to 1 micrometers resulted in increased $SO_2$ removal, but no benefit was observed below this size. It is speculated that diffusion resistances within the particle are eliminated at particles sizes of 1–2 micrometers and further reductions offers no additional benefit. Pore plugging can be minimized if a sorbent has a high volume of larger pores (between 0.01 and 0.1 micrometers).

Economizer Dry Sorbent Injection

The amount of $SO_2$ capture depends on three competing reactions:

$$Ca(OH)_2+SO_2 \rightarrow CaSO_3+H_2O \tag{3}$$

$$Ca(OH)_2+CO_2 \rightarrow CaCO_3+H_2O \tag{4}$$

$$Ca(OH)_2 \rightarrow CaO+H_2O \tag{5}$$

The formation of sulfite (reaction 3) competes with the reaction between the abundant $CO_2$ and $Ca(OH)_2$ to form $CaCO_3$ (reaction 4). Furthermore, dehydration (reaction 5) forms relatively unreactive CaO, reducing the amount of $Ca(OH)_2$ available for reaction.

The intrinsic rates (which are related to pore surface area of sorbent) of reactions (3) and (4) are very fast even at 490° C. However, because of the low concentration of $SO_2$ in the flue gas, reaction (3) is controlled by bulk diffusion of $SO_2$ for particles larger than 5 micrometers (diffusion rate for spherical particles is inversely related to particle size to the second power), whereas reaction (4) is controlled by intrinsic rate. As a result, the relative rates for reactions (3) and (4) depend both on pore surface area and particle size of the sorbent. Increasing pore surface area would favor the carbonation reaction (4) if particle diameter is held constant. Decreasing particle size and holding pore surface area constant would favor reaction (3). A sorbent with high pore surface area and small particle size would be expected to show high $SO_2$ removal efficiency under boiler economizer conditions.

Post-furnace Sorbent Injection/Humidifier (Coolside)

In this process the hydrate is injected either upstream or downstream of a water spray. The sorbent particles are wetted by inertial impaction with droplets or bulk condensation. $SO_2$ is removed by the entrained sorbent/liquid droplets in the ductwork, forming calcium sulfite:

$$Ca(OH)_2+SO_2 \rightarrow CaSO_3+H_2O \tag{6}$$

Results of laboratory-scale experiments indicate that significant sulfur capture can only occur if the sorbent is physically wetted.

The capture of sulfur by the slurry droplet is controlled by a number of processes, including:

1. The rate of transport of sulfur to the external surface of the droplet.
2. The rate of dissolution of the calcium hydroxide within the droplet.
3. The rate of dissolution and transport of sulfur within the liquid phase.
4. The rate of the intrinsic chemical reaction between sulfur and calcium species.
5. The rate of diffusion of reactants or products through calcium sulfite layer (product layer diffusion).
6. The rate of diffusion of reactants or products through pores.

The bulk diffusion of $SO_2$ to the droplet (step 1) is believed to be the limiting resistance for sulfur capture for about one half of the droplet lifetime. During this period physical properties of the sorbent do not influence the rate of sulfur capture.

The most probable limiting mechanism for the remaining life of the droplet is diffusion of reactant or product through a product layer of calcium sulfite on the surface of unreacted hydrated lime (step 5). In this case the rate of reaction at any conversion level should vary as the square of the initial surface area. However, if a large portion of surface area is associated with small pores, pore plugging and pore diffusion limitation will also result. The rate of sulfur capture would also be proportional to the initial surface area of hydrate if surface reaction kinetics (step 4) or dissolution of hydrate (step 2) are the limiting mechanisms.

Results of Sulfur Dioxide Removal Testing

Furnace sorbent injection tests of the three inventive calcium hydroxide sorbents and those of U.S. Pat. No. 4,636,379 and commercial hydrates were performed in a 14 kw pilot-scale Innovative furnace reactor at the U.S. EPA. The sorbents were injected into the furnace at a temperature of 1200° C., at Ca/S ratios of 1:1 and 2:1, and at an $SO_2$ concentration of 2500 ppm. Several tests were repeated to verify the data.

Boiler economizer tests of the sorbents were performed in a bench-scale flow reactor. The tests were performed under differential conditions with respect to the $SO_2$ concentration (i.e., very low sample feed rates were used, $SO_2$ concentration remained essentially constant at 3000 ppm, and Ca/S approaching zero). Reaction temperatures of 540° C. and 2.0 second residence times were selected. Five to ten repeat tests were made to confirm the data.

Coolside tests of the sorbents (except the hydrate of U.S. Pat. No. 4,636,379) were performed in the 100 kw Coolside pilot unit located in the R&D Department of the Consolidation Coal Company. The test program involved testing the sorbents at Ca/S ratios of 0.5, 1.0, and 2.0 and approaches to adiabatic saturation temperature of 25° and 35° F. One of the tests was repeated to confirm the data, and a test was performed using a commercial hydrated lime that had given the best performance during four years of examining the Coolside unit. The common conditions were 300° F. inlet flue gas temperature, 1500 ppm inlet $SO_2$ content (dry basis), and 125° F. adiabatic saturation temperature. The flue gas flow rate was set at 175 scfm, which provided a 2.0 second humidifier residence time. $SO_2$ removals reported include capture both in the humidifier and the baghouse.

Figure 6A:
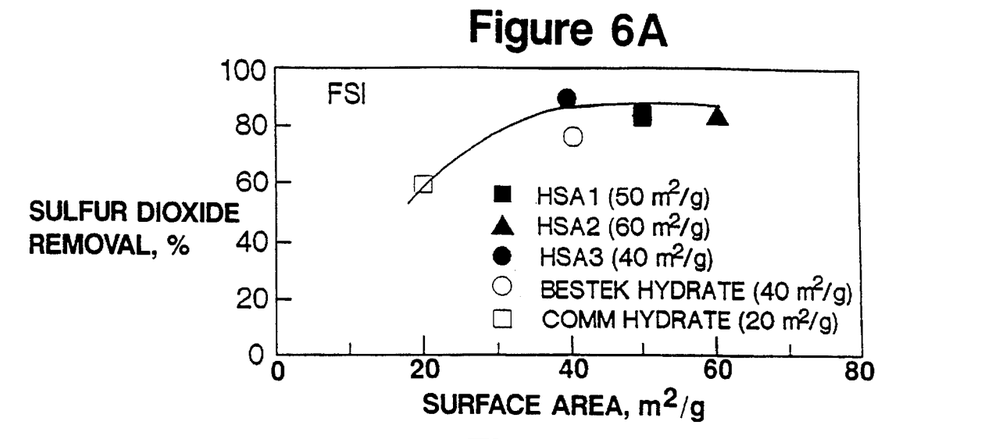
FIGS. 6A, 6B and 6C graphically depict the degree of $SO_2$ removed from waste gas streams as a function of surface area for several hydrated limes under furnace sorbent injection, boiler economizer, and Coolside conditions, respectively.
Figure 6B:
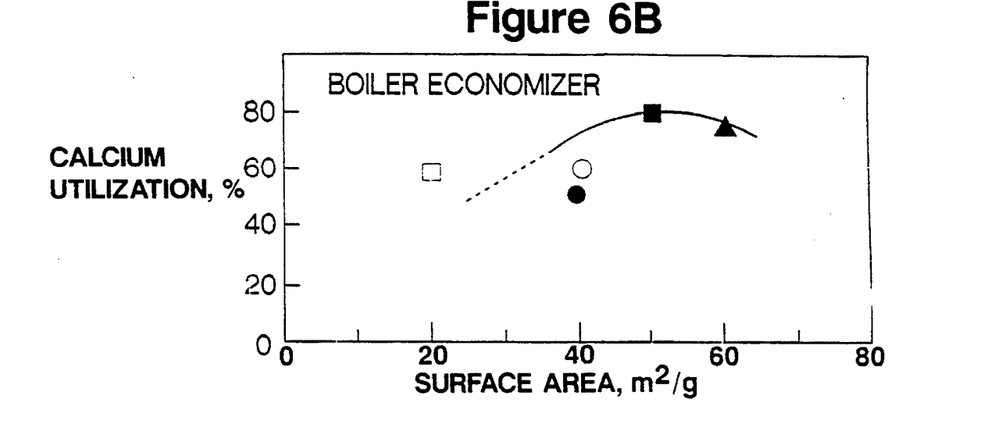
Figure 6C:
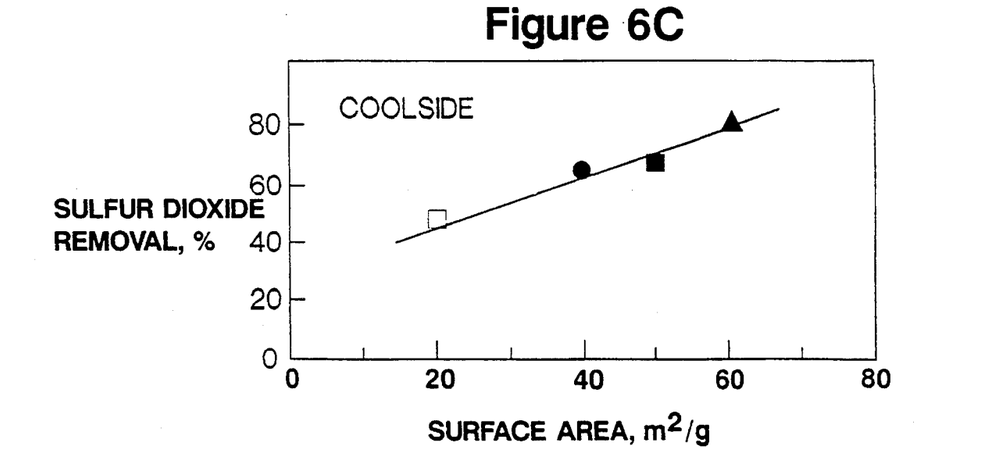
Figure 7:
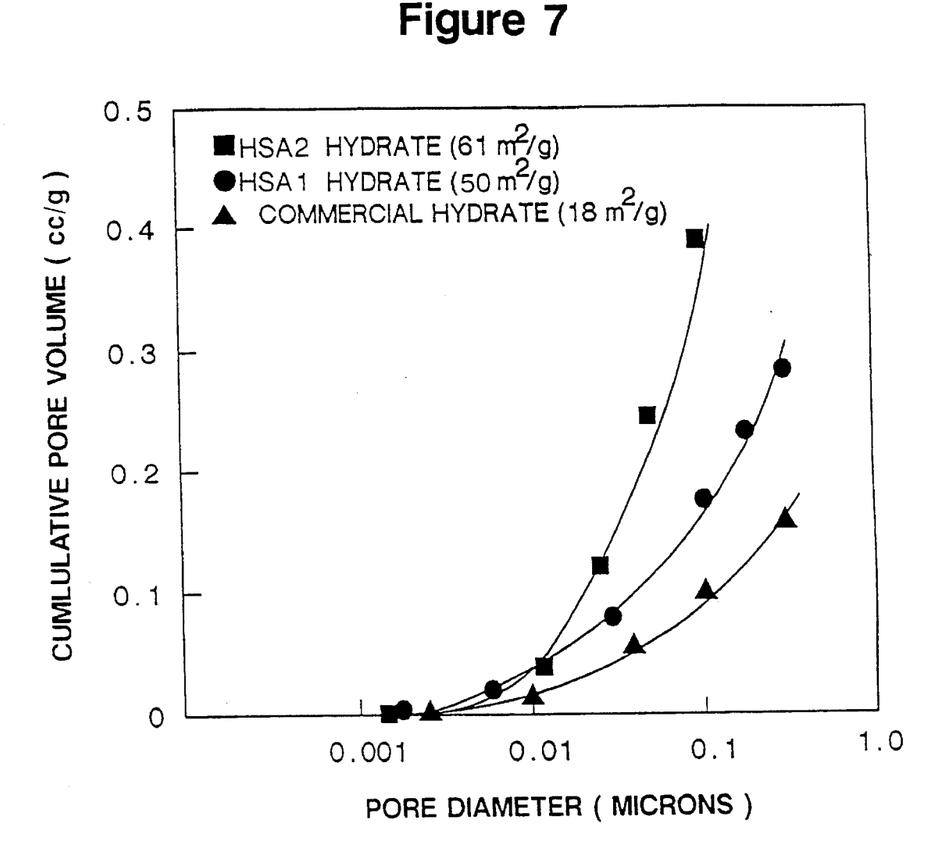
FIG. 7 is a graph illustrating cumulative pore volume vs. pore diameter for high surface area and commercial hydrated limes.

FIGS. 6A, 6B and 6C and Table 3 show the effect of hydrate surface area on $SO_2$ capture (at Ca/S=2.0) under different dry sorbent injection conditions. Under identical test conditions, optimum products made by the invention removed substantially more $SO_2$ than both the commercial hydrates and products made by Bestek et al. U.S. Pat. No. 4,636,379. It is clearly seen that there is an optimum surface area of hydrate for maximum sulfur capture in each of the three systems. Under FSI conditions, the HSA3 (40 $m^2/g$) hydrate showed the highest $SO_2$ capture (89%) followed by HSA1 (50 $m^2/g$) and HSA2 (60 $m^2/g$), each of which removed 83%. The $SO_2$ removal for the product made according to U.S. Pat. No. 4,636,374 (40 $m^2/g$) and the commercial hydrate were 78% and 60%, respectively. Enhanced performance of the inventive hydrates could be related to their smaller particle size, higher surface area, and greater pore volume. Pore volume analyses of raw sorbents, shown in FIG. 7, indicate the volume of pores between 0.01 and 0.1 micrometers (10 and 100 nm) was substantially higher for the HSA1 and HSA2 hydrates than for commercial hydrate A in Table 1. Pore volumes of hydrated limes are expected to correlate with pore volumes of the corresponding calcines. Due to the increase in molar volumes when converting from CaO to $CaSO_4$ (16.9 vs. 46.0 $cm^3$/mole), pore plugging is known to limit the sulfation reaction. Therefore, sorbents with a high volume of larger pores are expected to capture more $SO_2$.

Under boiler economizer conditions, the $SO_2$ capture for HSA1, HSA2, HSA3, U.S. Pat. No. 4,636,379 hydrate (HSAG) and the commercial hydrate were 80%, 75%, 51%, 61% and 55%, respectively. Under Coolside conditions the $SO_2$ removal was 67% for HSA1, 81% for HSA2, 65% for HSA3, and 50% for the commercial hydrate. As described above, in the Coolside process a hydrate with high surface area is desired.

TABLE 3

| | | | $SO_2$ Removal Data | | |
|---|---|---|---|---|---|
| SAMPLE ID | HYDRATE SURFACE AREA ($m^2/g$) | PARTICLE SIZE (microns) | $SO_2$ REMOVAL (%) | | |
| | | | $CS^1$ | $BE^2$ | $FSI^3$ |
| HSA1 | 45–50 | $0.7^a$ $(3.5)^b$ | 67 | 80 | 83 |
| HSA2 | 60–65 | $0.8^a$ $(3.5)^b$ | 81 | 75 | 83 |
| HSA3 | 35–40 | $1.1^a$ | 65 | 51* | 89 |
| $HSAG^c$ | 40 | NA $(15)^b$ | NA | 61 | 78 |
| $COMM^d$ | 15–20 | $1.7–2.5^a$ $(22)^b$ | 40–50 | 45–60 | 60–65 |

[1]Coolside; 1500 ppm $SO_2$; approach to saturation = 25° F.; duct and baghouse; Ca/S = 2 (sample 3 months old)
[2]Boiler economizer; differential reactor; Ca/S approaching zero; T = 540° C.; 3000 ppm $SO_2$; 5% $O_2$; 95% $N_2$ (sample 1 year old)
[3]Furnace sorbent injection; 2500 ppm $SO_2$; T = 1200° C.; Ca/S = 2 (sample 1 year old)
[a]measured by Sedigraph particle size analyzer
[b]measured by Microtrac particle size analyzer
[c]hydrate made according to Bestek, et al. U.S. Pat. No. 4,636,379
[d]commercial hydrated lime
NA - not available
*believed to be too low Hydrate Properties Important for $SO_2$ Capture and Hydration Methods FIG. 5 shows temperature profiles obtained during production of HSA1, HSA2, and HSA3 hydrated limes (see Table 1) in a batch hydrator. The conditions used to prepare HSA2 (60 $m^2/g$), Profile A, provided the highest surface area hydrate. This hydrate showed the best $SO_2$ capture under Coolside conditions. As shown in FIG. 6C, in the Coolside process the capture is directly related to hydrate surface area.

The conditions used to prepare HSA1 (50 $m^2/g$), Profile B, provided the smallest particle size. This hydrate was the most reactive hydrate for FSI and boiler economizer applications (see FIG. 6B). Hydrate (HSA3) produced according to Profile C using a commercial lime had a comparable surface area to that of the product made according to Bestek process (U.S. Pat. No. 4,636,379). This hydrate was the most reactive hydrate for FSI applications, but showed the lowest $SO_2$ capture in the Coolside and boiler economizer processes among the HSA hydrates tested.

Profile D in FIG. 5 is the optimum profile for producing a hydrate for the boiler economizer process. From a processing point of view, the best conditions to achieve profile D is to hydrate an intermediate surface area lime, i.e., 3 $m^2/g$ lime and to use more alcohol than was used to achieve Profile B (an A:W ratio of 2:4:1 was used for Profile B). The use of more alcohol in the hydration solution will shift Profile B to the right (toward Profile D). The key processing variable is to use just enough alcohol to manufacture a dry hydrate (with minimum use of external heat) with desired properties for boiler economizer applications.

Profile D can also be achieved by hydrating the 8 $m^2/g$ lime; but this alternative is not as desirable. With a very reactive lime, i.e., one having a surface area greater than 6 $m^2/g$, a large amount of alcohol is required to shift Profile A to D. This, however, results in formation of loose agglomerates with effective diameters greater than 5 micrometers. The reactivity of the alcohol hydrate made with commercial lime (Profile C) cannot be improved substantially with further optimization of the hydration process variable because of the low reactivity of the feed lime.

Based on the foregoing data, the following conclusions can be made.

The optimum hydrates for maximizing $SO_2$ removal under FSI or boiler economizer conditions appear to have surface areas in the range of 40 to 50 $m^2/g$, mean particle diameters below about 2.5 microns, and pore volumes above about 0.25 cc/g. Hydrates with surface areas above 50 $m^2/g$ would likely be more effective for capturing $SO_2$ if their particle size could be significantly reduced (i.e., to less than 1 micron).

The best method for producing hydrates for optimizing $SO_2$ capture under FSI or boiler economizer conditions involves hydration of a 1.5 to 3.0 $m^2/g$ lime with 1.0 to 1.2 times stoichiometric water and 2.0:1 to 3.0:1 volumetric ratio of alcohol to water. Use of larger amounts of water and/or alcohol would appear to result in the production of undesirable large agglomerates. Under the hydration conditions stated here, some preheating of the slurry could be performed in the reactor to initiate the hydration reaction.

A highly preferred hydrate surface area for maximizing $SO_2$ capture under boiler economizer conditions appears to be in the range of 45 to 50 $m^2/g$.

Based on the foregoing data, hydrates having optimum properties for $SO_2$ removal in the Coolside process have surface areas of at least about 55 $m^2/g$ (e.g. about 60 $m^2/g$), mean particle diameters of below about 5 micrometers, and pore volumes above about 0.3 cc/g. For this system, particle size of hydrates appears to be of secondary importance.

The optimum method for producing hydrates for the Coolside process involves principally the use of the most reactive starting lime available (2.5–10 $m^2/g$ or greater surface area). Although the use of hydration solutions containing 1.1 to 1.3 times stoichiometric water and 2.0 to 3.0 volumetric ratio of alcohol to water has proven effective for producing materials with very high $SO_2$ captures, it may be possible that the use of larger quantities of water or alcohol could further enhance the $SO_2$ capturing ability of hydrates for Coolside process because large agglomerate sizes do not appear to adversely affect $SO_2$ removal rates. Hydrates prepared from the very reactive limes mentioned here would not require an external preheater.

The foregoing detailed description is given for clearness of understanding only, and no unnecessary limitations should be understood therefrom, as modifications within the scope of the invention will be apparent to those skilled in the art.

We claim:

1. Hydrated lime having a surface area greater than 55 $m^2/g$, mean particle diameter of less than about 2.5 micrometers, and pore volume of at least about 0.25 cc/g.

2. The hydrated lime of claim 1 wherein the average crystallite size thereof is about 150 Angstroms or less.

3. The hydrated lime of claim 1 wherein said surface area is in the range of greater than 55 $m^2/g$ to about 85 $m^2/g$, said mean particle diameter is in the range of about 0.5 to about 2.5 micrometers, and said pore volume is in the range of about 0.25 to about 0.6 cc/g.

4. The hydrated lime of claim 1 wherein said mean particle diameter is less than 1 micrometer.

5. A method of removing $SO_2$ from a gas stream which contains $SO_2$ comprising the step of contacting said stream with an effective amount of the hydrated lime of any one of claims 1–3 and 4.

* * * * *